Figure 1:
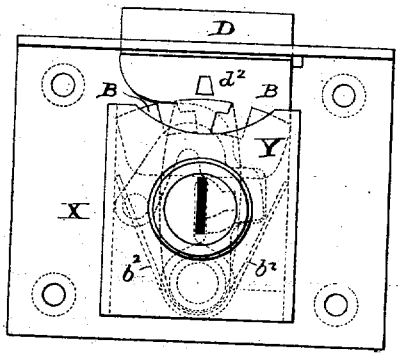
Figure 2:
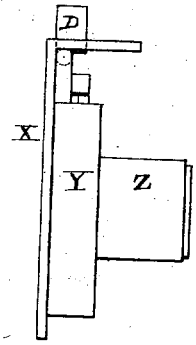
Figure 3:
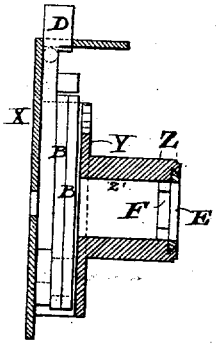
Figure 4:
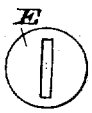
Figure 5:
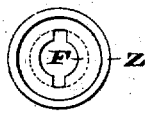
Figure 6:
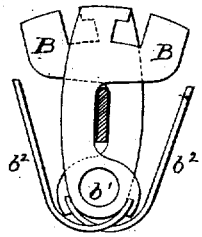
Figure 7:
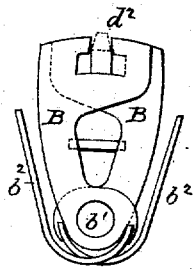
Figure 8:
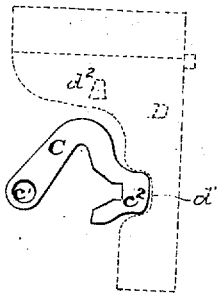
Figure 9:
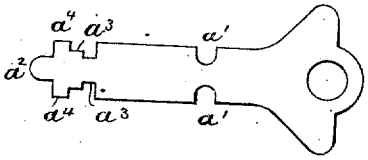

W. H. TAYLOR,

Assignor to THE YALE LOCK MANUFACTURING COMPANY.

LOCK.

No. 10,012. Reissued Jan. 17, 1882.

WITNESSES

Wm. A. Skinkle.

Jas. S. Latimer

INVENTOR

Warren H. Taylor

By his Attorneys

Baldwin, Hopkins, & Peyton.

N. PETERS. Photo-Lithographer. Washington, D. C.

UNITED STATES PATENT OFFICE.

WARREN H. TAYLOR, OF STAMFORD, CONNECTICUT, ASSIGNOR TO THE YALE LOCK MANUFACTURING COMPANY, OF SAME PLACE.

LOCK.

SPECIFICATION forming part of Reissued Letters Patent No. 10,012, dated January 17, 1882.

Original No. 172,899, dated February 1, 1876; Reissue No. 8,379, dated August 20, 1878. Application for reissue filed August 22, 1881.

*To all whom it may concern:*

Be it known that I, WARREN H. TAYLOR, of Stamford, in the county of Fairfield and State of Connecticut, have invented certain new and useful Improvements in Drawer or Cabinet Locks; and I do declare that the following is a full, clear, and exact description of my invention, which, when taken in connection with the accompanying drawings, will enable others skilled in the art to practice my invention.

My invention relates to that class of drawer or cabinet locks using a sheet-metal key and having a projecting key barrel or nosing.

My improvements consist in constructing such locks in the manner hereinafter set forth and claimed.

In the accompanying drawings, forming part of this specification, Figure I is a front elevation. Fig. II is a side elevation. Fig. III is a vertical section. Fig. IV to Fig. VIII are details of my lock, and Fig. IX represents the key.

Like letters of reference indicate like parts in all the figures.

The general construction of my improved lock is as follows:

X is the back plate of the lock.

Y is the front plate, formed with a barrel or nosing, Z.

A, Fig. IX, is the key, having an end pivot, $a^2$, guide-notches $a'$ $a'$, bits $a^3$ $a^3$, and wings $a^4$ $a^4$, both edges being alike.

B B are double tumblers, vibrating in opposite directions. For economy I pivot them upon one fixed center, $b'$. $b^2$ $b^2$ are the usual tumbler-springs, the free ends of which press against the flanges or sides of the front plate, Y.

C, Fig. VIII, is the talon-lever, which turns on a stationary pivot, $c'$, the free or vibrating end $c^2$ of which fits into the talon $d'$ of the bolt D. The inwardly-curved edge of the lever end $c^2$ forms the intermediate talon, against which one of the key-wings $a^4$ or $a^4$ strikes when throwing the bolt the full distance. The bolt D is provided with a fence or stump, $d^2$, projecting therefrom upon the side of the bolt upon which the tumblers lie. Each tumbler at its free end is made broader than the distance through which the tumblers are moved by the key, the object being to provide, first, when the tumblers are in the locked position and the bolt out, a solid surface of each tumbler at its free end, against which the stump may rest; and, second, at the same time to permit the bolt to be withdrawn or thrown forward by the key when the gatings of all the tumblers are brought in line.

Fig. VI represents the double tumblers closed. Fig. VII represents them fully open. E, Fig. III, is the rotating key-guide. (Shown in elevation in Fig. IV.) It is secured in the outer end of the barrel or nosing Z, and is capable of rotation therein, and its key-hole conforms to the section of the shank or blade of the key at its largest part. The inner portion of the barrel Z (represented at $z'$) serves to assist in guiding the key into position for operating the lock, and the rotating key-guide E, combined with the end pivot, $a^2$, of the key, and the end bearing, $x'$, formed in the back plate of the lock, serve to keep the key central while being operated, both to set the tumblers and throw the bolt. Within the barrel or nosing is formed the slotted retaining ring or flange F, (shown in front elevation, Fig. V,) with the rotating key-guide E removed. The two parts of the said flange enter, when the key is revolved, respectively, the notches $a'$ $a'$, formed in the margin of the key-shank and at opposite points thereon. The action of the slotted retaining-flange in connection with the notches $a'$ $a'$ of the key is to hold the key and prevent its being withdrawn except when the lock is in the locked or unlocked positions, or, in other words, except when the key-shank is vertical.

In my lock the key is inserted between the series of tumblers, and in unlocking the bits $a^3$ $a^3$ act upon the operative faces of the tumblers to force them apart, separating those of the series which lie to the right of the key from those which lie to the left of the key. The tumblers B B are superimposed upon the pivot $b'$, and the operative face of no tumbler is opposite the operative face of any other tumbler.

It is evident that any number of tumblers may make up the series, and so long as the tumblers are superimposed so that those on the right of the key are not opposite those on the left of the key, and so long as the key is bitted alike on both edges, it will be evident that the key can be inserted and the lock successfully operated with either edge of the key uppermost when it is passed through the vibrating guide E and the slotted retaining ring or flange F.

If two tumblers are used to make up the series, two depths of bitting can be had, and if four tumblers are used to compose the series, four depths of bitting can be had, while with a key bitted alike on both edges, the key can be inserted and caused to penetrate into the series of tumblers with either edge uppermost, and at the same time successfully operate the lock. This benefit could not be obtained with locks having their tumblers opposite each other, or rather with locks the operative faces of whose tumblers faced one another on the right and the left of the key. With such locks having a key bitted alike on both edges, so as to operate the lock without regard to which edge of the key is uppermost when inserted, double the number of tumblers must be used to obtain the variations in the bittings of the key that are necessary with my plan.

The action is as follows: The key A, being equally bitted on both edges, may be passed either edge up through the rotating key-guide E and through the vertical slots of the retaining ring or flange F. The key will penetrate into and through the series of two or more tumblers, and its end pivot, $a^2$, will enter into the bearing $x'$. The notches $a'$ $a'$ will then coincide with the retaining ring or flange, and the key can be turned a half-revolution either way for locking or unlocking. During such half-revolution the unslotted portions of the retaining ring or flange will engage with the notches $a'$ $a'$ and prevent the withdrawal of the key until it is again vertical and the bolt is either fully in or fully out. In the act of locking, the key on being turned a quarter-revolution in the direction of the arrow, Fig. VIII, causes the parts to reach the position there shown. At this time, and when in such position, the bits $a^3$ $a^3$, being horizontal, fully open the tumblers, and the fence $d^2$ can escape, as in Fig. VII. As the key has like bits upon its two edges, it may be inserted either edge up, and each of the tumblers of the superimposed series will be acted upon by a bit of proper depth; but said bit may be the one formed upon one or the other of the edges of the key indifferently. Simultaneously with the said quarter-turn of the key, its wing $a^4$, (or one of the wings,) by action upon the talon-lever C, has carried the latter upward to the horizontal position, half-throwing the bolt D, as shown in Figs. VII and VIII. In the succeeding quarter-turn the key again becomes vertical for withdrawal, as in Fig. VI, leaving the tumblers closed beneath the fence $d^2$ and the bolt D locked, as in Fig. I. The backward half-revolution of the key effects the aforesaid movements in reverse order for unlocking.

By my plan the front plate, Y, of the lock is not penetrated by the rotating key-guide, which latter is located wholly within the nosing or barrel Z and in front of the slotted retaining-flange F.

What I claim, and desire to secure by Letters Patent, is—

1. In a lock, a series of two or more pivoted vibrating tumblers no two of which are opposite, and which are arranged to be operated successfully by a flat or plate key bitted alike on both edges and inserted either edge up through the series, substantially as herein described.

2. A flat or plate key bitted alike on both edges and provided with indentations or notches opposite each other, one on either edge, in combination with a series of pivoted oscillating tumblers, and a slotted retaining flange or ring to interlock with the indentations or notches and prevent the withdrawal of the key from the lock except when said key is vertical, and to assist in holding said key longitudinally while it is moving the tumblers to lock or unlock the lock, substantially as herein described.

3. In a lock constructed for a flat or plate key, a vibrating talon-lever, its inner curved edge being the intermediate talon for the key-bit and its outer or free end fitted into the bolt-talon and actuating the bolt, substantially as described.

4. The combination of a bolt carrying a stump or fence with a series of two or more tumblers which are pivoted upon a common center, but no two of which are opposite, the free end of said tumblers being broader than the greatest distance through which the tumblers are moved by the key, so that gatings may be made in said tumblers, into which the stump or fence of the lock may pass when the lock is unlocked.

5. In a lock, a passage or key way through which a flat or plate key may be inserted, and in entering which the key is first passed through a rotating key-guide, next through a slotted retaining-flange, and lastly through a series of vibrating tumblers, the longitudinal movement of the key being finally arrested by a stop placed in the rear of the vibrating and superimposed series of tumblers, substantially as herein described.

WARREN H. TAYLOR.

Witnesses:

GEO. E. WHITE,

SCHUYLER MERRITT.